US 6,917,801 B2

(12) United States Patent
Witte et al.

(10) Patent No.: US 6,917,801 B2
(45) Date of Patent: Jul. 12, 2005

(54) COMMUNICATION SYSTEM FOR USE WITH A VEHICLE

(75) Inventors: Markus Witte, Gothenburg (SE); Mats Petersson, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 10/023,539

(22) Filed: Dec. 17, 2001

(65) Prior Publication Data

US 2002/0107010 A1 Aug. 8, 2002

(30) Foreign Application Priority Data

Dec. 22, 2000 (EP) ............................................. 00128302

(51) Int. Cl.$^7$ ................................................ H04M 3/42
(52) U.S. Cl. ...................... 455/418; 455/456; 455/419; 455/420; 455/345; 455/3.05; 340/539; 340/525; 340/425.5; 340/426; 340/523; 340/988; 340/825.31; 701/1; 701/34
(58) Field of Search ........................... 340/539, 825.31, 340/525, 425.5, 426, 523, 988; 455/418, 419, 420, 345, 3.05, 456; 201/1, 34; 123/129

(56) References Cited

U.S. PATENT DOCUMENTS 4,606,307 A * 8/1986 Cook ...................... 123/179.2
5,864,297 A    1/1999 Sollestre et al.
6,169,497 B1 * 1/2001 Robert ....................... 340/988
6,631,271 B1 * 10/2003 Logan ..................... 455/456.1
2002/0146999 A1 10/2002 Witte

* cited by examiner

Primary Examiner—David Hudspeth
Assistant Examiner—David Q Nguyen
(74) Attorney, Agent, or Firm—Jennifer M. Stec; Brooks & Kushman

(57) ABSTRACT

This invention relates to a communication system for use with a vehicle. The system comprises a first communication unit (1), being positioned within a vehicle (2), and a second portable communication unit (7). The first communication unit (1) comprises a first memory circuit (4) being connected with a first transceiver (3), and said second communication unit (7) comprises a second memory circuit (10) being connected with a second transceiver (9). The transceivers (3,9) are arranged to establish a short-distance wireless communication link (8) between said first and second communication units when the communication units are within a communication range from each other, thereby enabling two-way communication between said communication units. An information item, stored in any one of said memory circuits is automatically transmitted to the other one of said memory circuits (4,10), over said wireless communication link (8) when the communication units (1,7) are within said communication range from each other.

Further, the invention relates to a fob unit, comprising a second communication unit, for use in a communication system as described above.

11 Claims, 3 Drawing Sheets

COMMUNICATION SYSTEM FOR USE WITH A VEHICLE

TECHNICAL FIELD OF THE INVENTION

The present invention relates to a communication system for use with a vehicle.

The invention also relates to a fob unit for use in such a communication system.

BACKGROUND ART

There are today many systems for remote locking and unlocking of vehicles on the market. Most systems comprise a handheld wireless remote control unit, also referred to as a fob, being equipped with a transmitter, for wireless transmission of a locking/unlocking signal to a receiver unit being placed within a vehicle. A locking/unlocking signal is sent from the fob to the receiver unit by actively pushing a button on the fob when approaching/leaving the vehicle. When the receiver unit receives the locking/unlocking signal, it sends a locking/unlocking signal to the lock mechanisms in the vehicle doors, wherein the lock mechanisms are released/locked.

However, even if such a remote key system provides for an easy access to a vehicle, it does not necessarily facilitate quick drive-away, since there are still many settings to be made, before a user comfortably and safely may start the vehicle and drive away.

Further, many vehicles are equipped with travel computers, providing a user of the vehicle with information about for example the distance to a pre-programmed destination or information regarding the fuel level of the tank in view of previous fuel consumption. However, many users do not take full advantage of the travel computer since it may be time consuming to program the computer. A further disadvantage with this construction is that the editing of the settings in the travel computer must be made when the user is in the vehicle, which further delays the drive-away.

Therefore, it is a primary object of the present invention to provide a system for easy access to vehicle data from a distance.

Another object is to provide a system, in which it is possible to change vehicle settings and personal settings from a distance.

Another object of the invention is to provide a flexible system, which may be used in a variety of ways.

SUMMARY OF THE INVENTION

These and other objects are achieved by a communication system for use with a vehicle, said system comprising a first communication unitlocated within a vehicle, and a second portable communication unit, said first communication unit comprising a first memory circuit, connected with a first transceiver, and said second communication unit comprising a second memory circuit, connected with a second transceiver, said first and second transceivers being arranged to establish a short-distance wireless communication link between said first and second communication units when the communication units are within a communication range from each other, thereby enabling two-way communication between said first and second communication units, whereby an information item, stored in any one of said memory circuits is transmittable to the other one of said memory circuits, over said wireless communication link when the communication units are within said communication range from each other. With a communication system in accordance with the invention it is possible to transfer information between a portable unit and the vehicle automatically, without user assistance.

Preferably, said second communication unit is a portable fob. This is a practical solution, since most vehicles today are equipped with a fob for remote locking/unlocking of the vehicle doors. Consequently a user of a vehicle already normally carries such a component, making the system according to the invention consumer friendly.

Suitably, said second communication unit is connectable to an external information source, such as a personal computer, in order to establish an information transmission channel between said external information source and said second communication unit. This enables the user to simply add information to the fob, by for example editing personal settings and other information at an external source such as a PC, and thereafter load this information into the fob, for further transfer to the first communication unit of the vehicle. Thereby, there is a reduced need for having complicated programmable means in the fob.

In accordance with a preferred embodiment, said second communication unit is connectable with a unit for long-distance wireless communication, such as a cellular terminal, and said first communication unit is connectable with a long-distance wireless communication network, such as a cellular network, whereby a two-way connection between the first and second communication unit is established by connecting said terminal with said first communication unit over said network. This embodiment enables a user to perform an information transfer over a long distance, by use of for example a cellular telephone. This may be useful, for example in order to perform a long-distance check of the fuel level or the location of the vehicle, or in order to check if the doors of the vehicle are locked.

Suitably, said first and second communication unit each comprises an identification item, whereby a request for connection from any communication unit is tested to be qualified before a connection between said communication units is enabled. This feature make it possible to determine which communication units should be able to communicate with each other, when several units are within communication range from each other. Consequently, a second communication unit, or a fob, may be associated with a certain vehicle, providing a safe transfer of information.

In accordance with yet another embodiment of the invention, said second communication unit is integrated in a cellular terminal. This construction facilitates the use of a single unit for short-distance as well as long-distance communication.

Said first communication unit is further suitably connected with a controller area network within said vehicle. Thereby basically all features that may be measured electrically within a vehicle may be accessed in a communication system in accordance with the invention.

According to a preferred embodiment, said first communication unit is connected with a vehicle computer within said vehicle. Thereby travel information, such as route plans or desired time of arrival may easily be transferred between the second communication unit and the vehicle travel computer.

Preferably, said second communication unit further comprises a clock device, which for example may be used to set an alarm for a user, giving the user an indication about when to leave in order to reach a destination at a desired time.

Further, said second communication unit preferably comprises a biometric sensor 18, for identifying a user. This user identification may be used in order to personalise the vehicle and different vehicle settings before the user enters the vehicle. Further, said biometric sensor 18 is suitably used to classify users in order to give different users different access to the vehicle. In this way users may for example be divided into registered users, whose biometric characteristics (such as a fingerprint) are stored in the system, and non-registered users, whose biometric characteristics are unknown to the system. Consequently, standard settings may be provided for non-registered users, while personalised settings are provided for each of said registered users. Finally, the above mentioned and other objects are achieved by a fob unit, for use in a communication system as described above.

BRIEF DESCRIPTION OF THE DRAWING

A currently preferred embodiment of the present invention will now be described in closer detail, with reference to the accompanying drawing.

DETAILED DESCRIPTION OF THE PREFERRED EMBODIMENT OF THE INVENTION

The embodiment of the invention, which will be described in the following, is related to an information transfer system for use with a vehicle.

Figure 1:
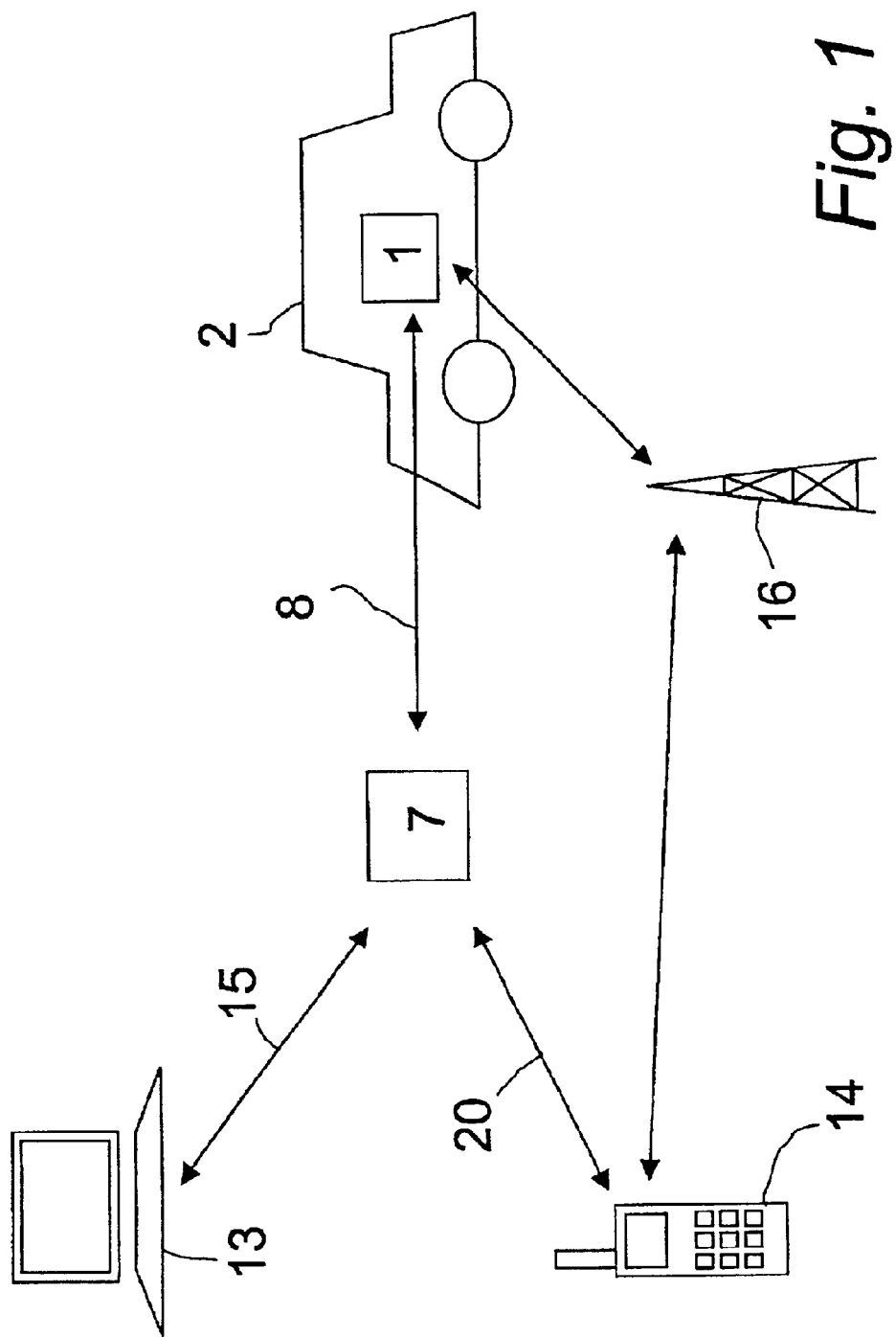
FIG. 1 is a schematic view of a system in accordance with the invention.
Figure 2:
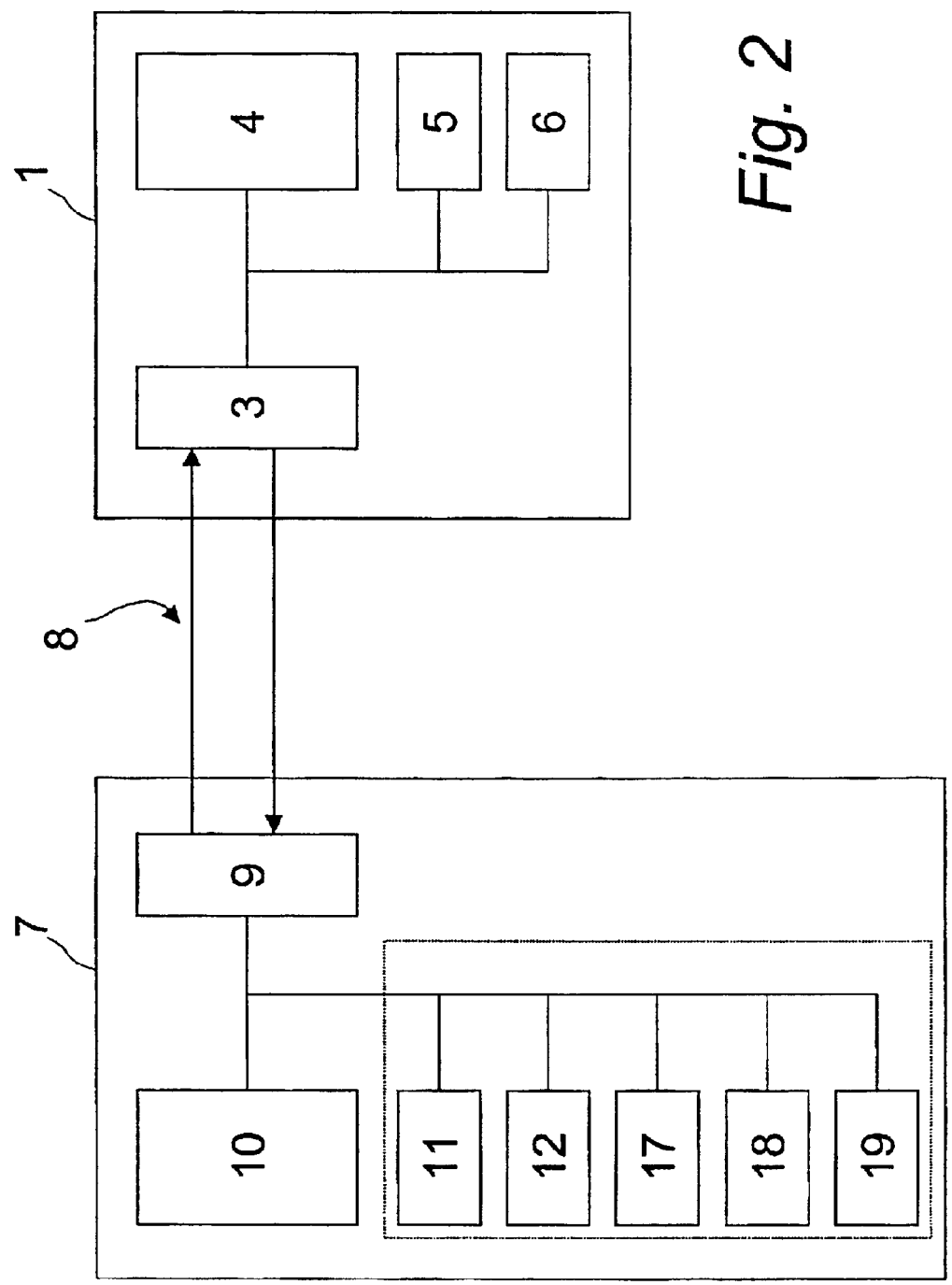
FIG. 2 is a block diagram of one preferred embodiment of the invention.
Figure 3:
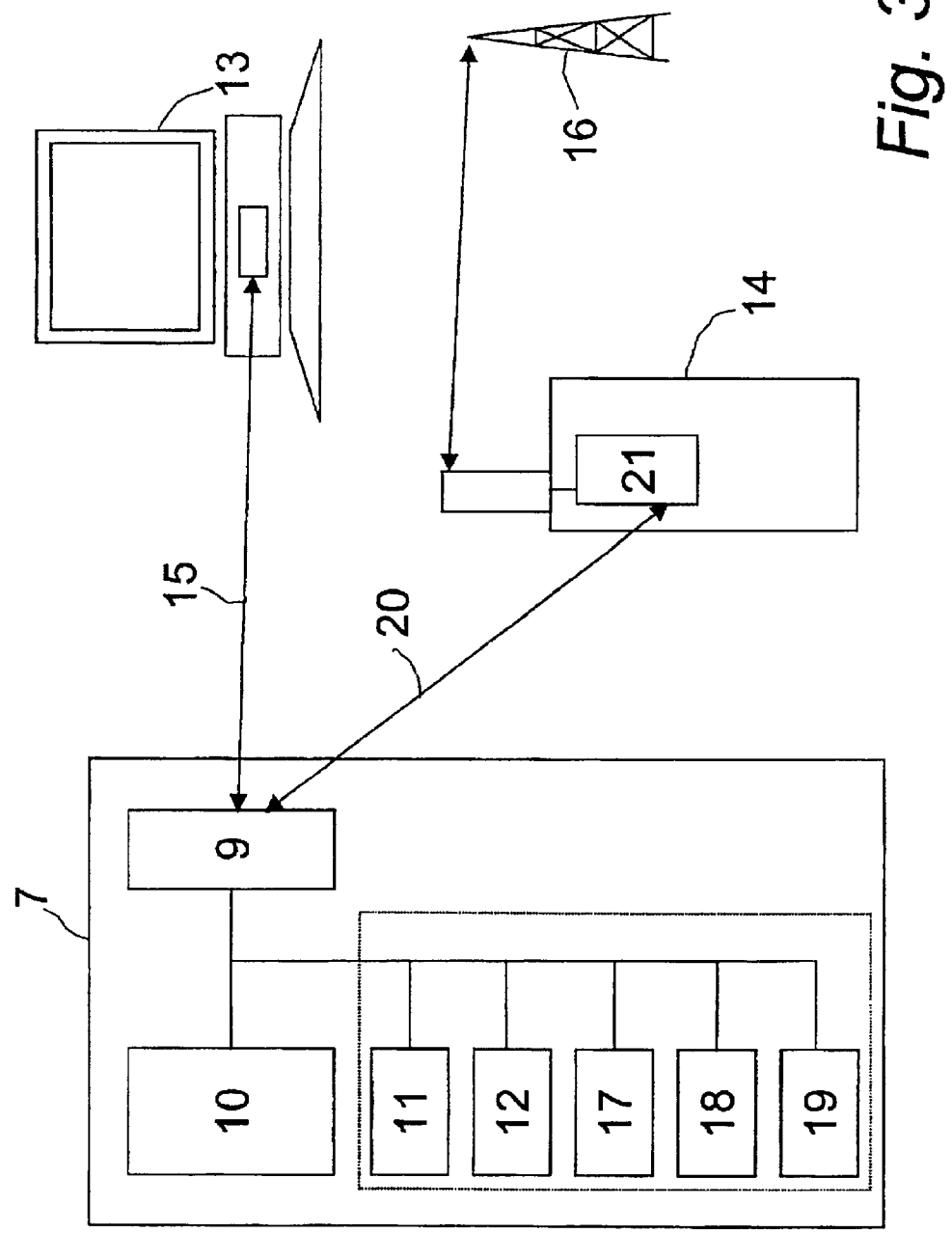
FIG. 3 is a block diagram of another aspect of the invention.

Referring now to FIG. 1, the system comprises a first communication unit 1, being positioned within a vehicle 2. The first communication unit 1 comprises a first transceiver 3 for wireless communication and a first memory circuit 4. The first memory circuit 4 is connected to said first transceiver 3, in this case being a standard Bluetooth circuit. The first communication unit 1 is further connected with a vehicle travel computer 5. In this case, the first communication unit 1 is also connected with a controller area network 6 within said vehicle 2.

The system further comprises a second communication unit 7, here constituted by a portable, handheld fob unit, comprising a second transceiver 9 for wireless communication, being compatible with said first transceiver 3, and a second memory circuit 10. The second memory circuit 10 is connected to said second transceiver 9, in this case being a standard Bluetooth circuit. Further, the fob unit may be equipped with a display 11, for displaying information stored in said second memory circuit 10, a processor 12 for processing information stored in said second memory circuit 10 and a clock circuit 17 for use in certain applications. The second communication unit 7 further comprises a battery 19 or the like, for providing power to the components of the second communication unit 7.

Said first and second Bluetooth transceivers 3, 9 are connectable with each other when said transceivers are within a short/medium distance from each other (in the Bluetooth case<100 m), thereby establishing a communication link 8 between the fob unit 7 and the first communication unit 1 disposed within the vehicle 2. The establishment of this communication link 8 is in this case performed in accordance with the Bluetooth standard, and will not be described herein. However, it should be mentioned that each Bluetooth circuit is equipped with a special identification code, being unique for each circuit. This identification code enables a transceiver to establish a connection with one chosen other transceiver within the communication range. Further, in accordance with a preferred embodiment, each vehicle is provided with several associated fob units. In this case, each fob unit has a special fob ranking, whereby the fob with the highest ranking is arranged to override other fobs if two or several fobs are trying to give contradicting orders to the first communication unit 1.

In this embodiment of the invention, the information transfer between said communication units is connected with the locking or unlocking of the vehicle. A locking/unlocking device (not shown) is on per se known manner integrated in said fob unit 7. When a locking/unlocking signal is sent to the vehicle for locking/unlocking the doors of the vehicle, a part of this signal is also transmitted to a trigger device (not shown) for the generation of a trigger signal. This trigger signal is thereafter transmitted to the memory units, where it triggers the execution of an information transfer operation. Further, locking/unlocking signal may be sent over the second transceiver 9, or over a separate transmission channel.

By means of said second transceiver, said fob unit may also be connected with other communication units, such as a personal computer 13, a cellular telephone 14, a hand held computer or other on market products. By establishing a two-way communication link between for example a computer 13 and the fob unit 7 (second communication unit), an information item may be transferred between the computer and the fob. This enables a user to personalise a vehicle by loading information regarding for example travel plans, personal setting, road maps etc into the fob, whereby the information item is automatically transmitted to the vehicle as soon as the fob unit and the vehicle are within communication range from each other.

By using standard transceivers, such as Bluetooth circuits, the fob may easily be adapted for use in various other applications. For example the fob unit may be programmed to function as a remote garage door opener. Further, said second transceiver 9 of the fob unit 7 may be connected with a corresponding Bluetooth transceiver 21 in a cellular terminal 14, such as a cellular telephone, via a wireless communication link 20. By doing this, the fob may be used to establish a long-distance, secure communication between the fob and the vehicle, thereby enabling remote check and control.

An information item is stored in the second memory circuit 10 of the fob unit 7. The second transceiver 9 of the fob unit 7 regularly sends out an identification signal. When the fob unit 7 is within a communication range from a vehicle 2 having a corresponding first transceiver 3, accepting said identification signal, a communication link 8 between the transceivers 3,9 is established. The first transceiver 3 may also send out a corresponding identification signal that must be accepted by the fob unit 7, before said communication link 8 may be established. When said communication link 8 is established, the information item that is stored in said second memory circuit 10 is transferred over the communication link 8 to the first transceiver 3 of the first communication unit 1 within the vehicle 2. Thereafter, the item is transferred from the first transceiver 3 to the first memory circuit 4 or directly to the vehicle travel computer 5 or the like.

Further, an information item stored in the first memory circuit 4 may be transferred to the fob 7 over said communication link 8, in the same manner as described above. For example, information regarding the gasoline level may be gathered in the first memory circuit 4, and transferred to the fob unit 7 and stored in the second memory circuit 10, when leaving the vehicle 2. Consequently, this information is now available for remote check-up, since it is stored in the handheld, portable fob unit 7. Further, basically any information that may be gained through the vehicle control area network 6, may be transferred to the fob unit in the above manner. It shall be understood that the system also may comprise selector means (not shown), for selection of which information items should be transferred between the fob and the first communication unit.

Further, this information transfer may be useful in travel planning. One example is given below. A user has programmed a travel plan into the vehicle travel computer 5. The vehicle travel computer 5 has information regarding the distance to the destination, the desired time of arrival, the mean travel speed, and the time. If the user leaves the car during the trip, the above mentioned information is transferred from the travel computer 5 to the fob 7. Based on this information the estimated latest time of departure, in order to reach the destination on time, may be calculated, whereby the fob may be programmed to set of an alarm for example 15 minutes before said latest time of departure. Said alarm may be an audio signal or a visual signal. Further, said fob may be connectable with a traffic information source via a wireless link, for example over a cellular network, via a cellular telephone, as described above. Thereby, current traffic information, such as information regarding tailbacks on the planned route or the like, may be taken into consideration when calculating the above-described latest time of departure. In this application the fob should include a clock circuit 17 to keep the time, but it need not be set, since the correct time may be provided to the fob from the vehicle travel computer 5 at the time of information transfer.

The fob may further include a biometric sensor 18, such as a fingerprint sensor; being connected with said second transceiver, in order to provide for user identification, thereby enabling a personalization of the vehicle when approaching the vehicle. The identification may be transmitted over said communication link 8 to the vehicle 2 as an information item, as described above. This enables the performance of personal settings in the vehicle, such as seat and steering wheel settings before entering the vehicle. By this identification, different users may further be given different access to the vehicle, for example one-door/multi-door unlocking or access to the glove compartment.

A number of user profiles may be registered, enabling a number of users to be identified with said biometric sensor, and thereby providing individual settings for every registered user. One important feature is that if a non-registered user intends to use the vehicle, the fob will notice that the user is non-registered and thereby putting the system into a standard mode, using pre-programmed standard settings, being chosen and programmed by a registered user. Further a registered user may program different settings for different categories of non-registered users, in this way creating different non-registered user profiles, that may be activated by the fob by a registered user. Examples of such profiles may be a car repairer profile, with restricted access to for example the car telephone, the glove compartment and the trunk, a valet profile, with further restrictions regarding the vehicle speed, and a friend profile, only restricting the use of the car phone. The access given to a certain profile may be chosen and programmed by the registered user/users of the vehicle, and said profile is preferably activated by a registered user, before handing over the fob to a non-registered user. If no special profile is chosen for the non-registered user, said pre-programmed standard settings will be used. Further, the above mentioned restriction of the vehicle speed for some users is possible due to said connection of the first communication unit with the control area network of the vehicle. All those user specific features may easily be edited at a personal computer, and transferred to the fob, and thereafter to the vehicle. This user identification may also be used for other purposes, such as identifying a user at a tollbooth, for direct debiting of a personal account. According to one aspect of the invention, the fob may be used for entertainment. If the vehicle is equipped with for example a radio, cd-player or a television receiver, it is possible to transmit the audio-/video signal from one of these devices, over said short-distance wireless communication link 8, whereby it may be received by the fob. A video signal may then be displayed on said display 11. The fob may also be equipped with a speaker or the like in order to represent an audio signal. This enables a user to continue to listen to the vehicle radio or cd-player when he leaves the vehicle, but maintains within a communication range from the vehicle.

The present invention should not be considered as being limited to the above-described embodiment, but rather includes all possible variations falling within the spirit and the scope of this invention as defined by the appended claims. Many modifications and variations of the present invention will be readily apparent to those skilled in the art.

In the above, a preferred embodiment is described in which the second communication unit is comprised in a fob unit. However, it is possible to include said second communication unit in for example a cellular telephone or a portable handheld computer, reducing the number of components of the system.

The above described presently preferred embodiment of the invention utilises Bluetooth circuits as the first and second transceivers. However, it is possible to use other devices and methods to establish said two-way connection between the first communication unit in the vehicle and the second communication unit. For example, RF circuitry may be used. The communication units should then also include control circuits for the RF circuits in order to control the communication link and its establishment, on per se known manner. The corresponding control circuits are included in the Bluetooth circuit. The communication system may also comprise two or more ways of establishing said connection. As an example, a separate communication link, such as a RF communication link, may be used for the locking/unlocking signals of the vehicle door/doors, while the above described other communication link 8 is used for more extensive information transfer.

It shall be noted that the term transceiver as used in this application comprises various constructions, for example with separate receivers and transmitters.

What is claimed is:

1. A communication system for use with a vehicle, the communication system comprising:
    a first communication unit, located within a vehicle, the first communication unit interfacing with a vehicle computer such that bi-directional communication is enabled between the first communication unit and the vehicle computer; and
    a portable second communication unit;
    said first communication unit comprising a first memory circuit being configured to receive and store information from at least one of the vehicle computer and the second communication unit and connected with a first transceiver, and said second communication unit comprising a second memory circuit, configured to store information from at least one of the first communication unit and an external information source and connected with a second transceiver, said transceivers being arranged to establish a short-distance wireless communication link between said first and second communication units when the communication units are within a communication range from each other, thereby enabling two-way communication between said communication units, whereby an information item, stored in any one of said memory circuits is transmittable to the other one of said memory circuits, over said wireless communication link when the communication units are within said communication range from each other.

2. The communication system in accordance with claim 1, wherein said second communication unit is a portable fob.

3. The communication system in accordance with claim 1, wherein said second communication unit is connectable to said external information source, such as a personal computer, in order to establish an information transmission link between said external information source and said second communication unit.

4. The communication system in accordance with claim 1, wherein said second communication unit is connectable with a terminal unit for long-distance wireless communication and said first communication unit is connectable with the long-distance wireless communication network whereby a two-way connection between the first and second communication units is established by connecting said terminal with said first communication unit over said network.

5. The communication system in accordance with claim 1, wherein said first and second communication unit each comprises an identification item, whereby a request for connection from any communication unit is tested to be qualified before enabling a connection between said communication units.

6. The communication system in accordance with claim 1, wherein said second communication unit is integrated in a cellular terminal.

7. The communication system in accordance with claim 1, wherein said interface between said first communication unit and said vehicle computer comprises a vehicle data network within said vehicle.

8. The communication system in accordance with claim 1, wherein said vehicle computer is a travel computer.

9. The communication system in accordance with claim 1, wherein said second communication unit further comprises a clock device.

10. The communication system in accordance with claim 1, wherein said second communication unit further comprises a biometric sensor, for identifying a user.

11. The communication system in accordance with claim 10, wherein the output of said biometric sensor is used to classify users in order to give different users different access to the vehicle.

* * * * *